United States Patent [19]

Hisgen et al.

[11] Patent Number: 4,764,582
[45] Date of Patent: Aug. 16, 1988

[54] WHOLLY AROMATIC THERMOTROPIC POLYESTERS

[75] Inventors: Bernd Hisgen, Limburgerhof; Hans-Jakob Kock, Ludwigshafen; Michael Portugall, Wachenheim; Erhard Seiler, Ludwigshafen; Gerd Blinne, Bobenheim, all of Fed. Rep. of Germany

[73] Assignee: BASF Akjtiengesellschaft, Rheinland-Pflaz, Fed. Rep. of Germany

[21] Appl. No.: 84,165

[22] Filed: Aug. 11, 1987

[30] Foreign Application Priority Data

Aug. 28, 1986 [DE] Fed. Rep. of Germany ....... 3629209

[51] Int. Cl.⁴ ................... C08G 63/54; C08G 63/60; C08G 63/44
[52] U.S. Cl. ................... 528/183; 528/184; 528/193; 528/194
[58] Field of Search ............... 528/183, 184, 193, 194

[56] References Cited

U.S. PATENT DOCUMENTS

| | | | |
|---|---|---|---|
| 3,637,595 | 1/1972 | Cottis et al. | 528/179 X |
| 4,272,625 | 6/1981 | McIntyre et al. | 528/183 |
| 4,313,870 | 2/1982 | Imai et al. | 528/212 |
| 4,327,205 | 4/1982 | Kato et al. | 528/128 |
| 4,349,659 | 9/1982 | Kato et al. | 528/193 |
| 4,355,132 | 10/1982 | East et al. | 524/602 |
| 4,503,005 | 3/1985 | Ueno et al. | 264/102 |
| 4,539,386 | 9/1985 | Yoon | 528/183 |
| 4,563,508 | 1/1986 | Cottis et al. | 525/444 |
| 4,663,422 | 5/1987 | Inolle et al. | 528/176 |

FOREIGN PATENT DOCUMENTS 1507207  4/1978  United Kingdom .

Primary Examiner—Lucille M. Phynes
Attorney, Agent, or Firm—Oblon, Fisher, Spivak, McClelland & Maier

[57] ABSTRACT

Wholly aromatic thermotropic polyesters are based on
(A) from 25 to 60 mol % of a mixture of
  ($A_1$) 4-hydroxybenzoic acid and
  ($A_2$) 3-hydroxybenzoic acid, 4-aminobenzoic acid and/or 3-aminobenzoic acid or their chlorine, bromine, $C_1$–$C_8$-alkyl or $C_1$–$C_8$-alkoxy derivatives substituted in the nucleus,
  the molar ratio of $A_1$ to $A_2$ being from 5:1 to 41:1,
(B) from 20 to 37.5 mol % of a mixture of
  ($B_1$) terephthalic acid and
  ($B_2$) isophthalic acid,
  the molar ratio of $B_1$ to $B_2$ being from 1.04:1 to 19:1, and
(C) from 20 to 37.5 mol % of a mixture of
  ($C_1$) hydroquinone and
  ($C_2$) 4,4'-dihydroxydiphenyl,
  the molar ratio of $C_1$ to $C_2$ being from 0.1:1 to 2.67:1 and the molar ratio of B to C being from 0.9:1 to 1.1:1.

8 Claims, No Drawings

WHOLLY AROMATIC THERMOTROPIC POLYESTERS

The present invention relates to wholly aromatic thermotropic polyesters based on (A) from 25 to 60 mol % of a mixture of
  (A$_1$) 4-hydroxybenzoic acid and
  (A$_2$) 3-hydroxybenzoic acid, 4-aminobenzoic acid and/or 3-aminobenzoic acid or their chlorine, bromine, $C_1$–$C_8$-alkyl or $C_1$–$C_8$-alkoxy derivatives, substituted in the nucleus,
  the molar ratio A$_1$ to A$_2$ being from 5:1 to 41:1,
(B) from 20 to 37.5 mol % of a mixture of
  (B$_1$) terephthalic acid and
  (B$_2$) isophthalic acid,
  the molar ratio of B$_1$ to B$_2$ being from 1.04:1 to 19:1, and
(C) from 20 to 37.5 mol % of a mixture of
  (C$_1$) hydroquinone and
  (C$_2$) 4,4'-dihydroxydiphenyl,
  the molar ratio of C$_1$ to C$_2$ being from 0.1:1 to 2.67:1 and the molar ratio of B to C being from 0.9:1 to 1.1:1.

The present invention furthermore relates to a process for the preparation of such polyesters and their use for the production of fibers, films and moldings, and moldings which contain the novel wholly aromatic thermotropic polyesters as essential components.

The term thermotropic is used quite generally to describe substances which form liquid crystalline melts, i.e. melts having anisotropic properties.

Thermotropic aromatic polyesters of aromatic dicarboxylic acids and dihydroxy compounds, with or without aromatic hydroxycarboxylic acids, are known and are described in, for example, GB-A No. 2 061 304, DE-A No. 20 25 971, EP-A No. 33 147 and EP-A No. 92 843. The disadvantage of these known systems is the fact that they have to be prepared by a complicated and time-consuming multistage process. Furthermore, the products generally have melting points above 350° C., which makes processing by a thermoplastic method substantially more difficult.

DE-A No. 35 17 587 describes thermoplastic molding materials which, in addition to a base resin of an oxybenzoyl copolyester, contain a relatively small amount of a polymeric flow modifier obtained from terephthalic acid, isophthalic acid, 4-hydroxybenzoic acid, hydroquinone and 4,4'-dihydroxydiphenyl. The flow modifiers described in the Examples have very high melting points on the one hand (Example 3: higher than 400° C.) or, on the other hand, do not have a crystalline melting point, i.e. have only a low heat distortion resistance.

It is an object of the present invention to provide wholly aromatic thermotropic polyesters which, compared with the flow modifiers described in DE-A No. 35 17 587, are easier to process by a thermoplastic method and at the same time have improved heat distortion resistance.

We have found that this object is achieved, according to the invention, by the wholly aromatic thermotropic polyesters defined at the outset.

The products whose main chain possesses amide groups derived from aminobenzoic acids are also referred to as polyesters below, although these products may also be designated polyesteramides.

The novel wholly aromatic polyesters are composed of units derived from 4-hydroxybenzoic acid (A$_1$), 3-hydroxybenzoic acid and/or 4-aminobenzoic acid or 3-aminobenzoic acid or their chlorine, bromine, $C_1$–$C_8$-alkyl or alkoxy derivatives substituted in the nucleus (A$_2$), terephthalic acid (B$_1$), isophthalic acid (B$_2$), hydroquinone (C$_1$) and 4,4'-dihydroxydiphenyl (C$_2$).

The amount of component A is from 25 to 60, in particular from 35 to 55, mol %.

Component A is composed of 4-hydroxybenzoic acid (A$_1$) and the compounds (A$_2$) in a molar ratio of from 5:1 to 41:1, preferably from 6:1 to 20:1, in particular from 8:1 to 15:1.

The compounds A$_2$ are 3-hydroxybenzoic acid and 3- or 4-aminobenzoic acid or their chlorine, bromine, $C_1$–$C_8$-alkyl or $C_1$–$C_8$-alkoxy derivatives substituted in the nucleus. These compounds may be used individually or in any desired mixture with one another, provided that the molar ratio of A$_1$ to A$_2$ is from 5:1 to 41:1.

The unsubstituted compounds, i.e. 3-hydroxybenzoic acid, 3-aminobenzoic acid or 4-aminobenzoic acid, are preferably used. In some cases, it has proven advantageous to employ mixtures of the aminobenzoic acids or mixtures of hydroxy- and aminobenzoic acids in any molar ratio as component A$_2$.

Among the substituted derivatives, the chlorine, bromine and $C_1$–$C_6$-alkyl derivatives, in particular the methyl and ethyl derivatives are preferred. These too may be used individually or in any desired mixture with one another.

The mixtures of terephthalic acid and isophthalic acid (component B) are used in an amount of from 20 to 37.5, preferably from 22.5 to 32.5, mol %. The same also applies to the amount of the mixture of the dihydroxy compounds (component C).

The molar ratio of components B$_1$ to B$_2$, i.e. of terephthalic acid to isophthalic acid, is from 1.04:1 to 9:1, preferably from 1.5:1 to 10:1.

The molar ratio of hydroquinone (C$_1$) to 4,4'-dihydroxydiphenyl (C$_2$) is from 0.1:1 to 2.67:1, in particular from 0.5:1 to 2.33:1.

The thermotropic, i.e. liquid crystalline, state of the novel wholly aromatic polyesters can be detected, for example, using a polarization microscope by a method described in German Laid-Open Application DOS No. 2,520,819. Between crossed polarizers, the polymer melts, applied in a 10 μm thick layer between glass plates, have textures which may be assigned to a mesomorphic phase.

It is surprising that, compared with the flow modifiers described in DE-A No. 35 17 587, the novel polyesters have substantially improved properties with regard to processability and heat distortion resistance. This is achieved by the use of mixtures of isophthalic acid and terephthalic acid as the dicarboxylic acid component, and of mixtures of hydroquinone, 4,4'-dihydroxydiphenyl and, if appropriate, a dihydroxy compound of the general formula (I) as the dihydroxy component.

The melting point of the polyesters is in general from 280° to 350° C., in particular from 300° to 350° C.

The heat distortion point, determined according to ISO/R75, method A, is in general higher than 180° C., in particular higher than 200° C.

The shear modulus, determined according to DIN 53,445, at 200° C., is in general not less than 25%, in particular not less than 30%, of the value measured at 20° C. under otherwise identical conditions.

The relative viscosity of the novel wholly aromatic polyesters, determined in 0.1% strength by weight solution in pentafluorophenol at 60° C., is preferably from 1 to 4, in particular from 1.5 to 3.5, dl/g.

The novel thermotropic polyesters can in principle be prepared by a conventional process, as described in, for example, U.S. Pat. Nos. 4,375,530 and 4,118,372.

Advantageously, a process is used in which the starting materials $A_1$, $A_2$, $B_1$, $B_2$, $C_1$ and $C_2$ are subjected to a single-stage polycondensation in the melt in the presence of a 5-60% molar excess of an anhydride of an alkanecarboxylic acid of 2 to 6 carbon atoms. The molar excess of the anhydride is based on the total content of OH groups in the monomer mixture.

Among the anhydrides of the alkanecarboxylic acids of 2 to 6 carbon atoms, acetic anhydride, propionic anhydride and butyric anhydride are preferred, acetic anhydride being very particularly preferred. The molar excess of anhydride is preferably from 10 to 50 mol %.

It has also been found advantageous to carry out the reaction under an inert gas atmosphere, e.g. nitrogen or argon.

It is sometimes advantageous to accelerate the reaction by using catalysts, for example those described in EP-A No. 131 846. In this case, the amount of these catalysts is from 0.001 to 1% by weight, based on the total amount of the monomers used.

A particularly preferred embodiment of a process is described below.

The monomers $A_1$, $A_2$, $B_1$, $B_2$, $C_1$ and $C_2$ and the carboxylic anhydride are mixed under an inert gas atmosphere and refluxed while stirring. During this procedure, it is advantageous to increase the temperature stepwise by first maintaining a temperature of from 130° to 200° C. for up to 5, preferably up to 2, hours and then increasing the temperature to 250°-370° C., preferably in the course of from 2 to 2.5 hours. Excess carboxylic anhydride and carboxylic acids formed are distilled off during the reaction.

In order to obtain as quantitative a conversion as possible, it is advantageous to carry out the final phase of the reaction under reduced pressure, preferably under from 0.1 to 200 mbar (from 10 to 20,000 Pa).

The resulting wholly aromatic polyesters can then be subjected to postcondensation in the solid phase. This is preferably carried out at from 200° to 300° C., particularly preferably from 200° to 280° C. It is also possible to carry out the postcondensation in the solid phase after processing by a thermoplastic method.

Advantageously, the condensation in the solid phase is likewise carried out in an inert gas atmosphere, e.g. under nitrogen or argon.

In the process described above, wholly aromatic polyesters having advantageous properties are obtained in one stage in a relatively short time.

Conventional additives and processing assistants may also be added to the novel wholly aromatic polyesters. Examples include oxidation stabilizers, heat stabilizers, UV stabilizers, lubricants, mold release agents, dyes and pigments, fibrous and powdered fillers and reinforcing agents, nucleating agents and plasticizers. Additives of this type are known per se and are described in the literature.

Examples of oxidation stabilizers and heat stabilizers include halides of metals of group I of the Periodic Table, if necessary as a mixture with copper(I) halides or sterically hindered phenols, in concentrations of up to 1% by weight.

Suitable UV stabilizers are substituted resorcinols, salicylates, benzotriazoles, benzophenones and mixtures of these, which are generally added in amounts of up to 2% by weight.

Dyes and pigments are generally used in amounts of up to 5% by weight. Examples include nigrosine, titanium dioxide, cadmium sulfide, phthalocyanine dyes, ultramarine blue and carbon black.

Examples of fillers and reinforcing agents are carbon fibers, glass fibers, amorphous silica, calcium silicate, aluminum silicate, magnesium carbonate, kaolin, chalk, powdered quartz, mica and feldspar, which may account for up to 70% by weight, based on the total weight of the filled material.

Examples of nucleating agents are talc, calcium fluoride, sodium phenylphosphinate, alumina and finely divided polytetrafluoroethylene.

Up to 20% by weight of plasticizers, such as phthalates, hydrocarbon oils and sulfonamides can also be used.

The novel wholly aromatic polyesters have excellent heat distortion resistance and a smooth, glossy and very abrasion-resistant surface coupled with a very pale natural color. They are also substantially resistant to chemicals and flame-retardant and, for polyesters, possess excellent stability to hydrolysis.

Moldings produced from the novel wholly aromatic polyesters have excellent mechanical properties, in particular rigidity, strength and toughness. The said polyesters are therefore particularly useful for the production of moldings for the electrical industry, electronic computing and accounting machines, automotive construction and other industrial sectors.

The novel polyesters can also be used to produce fibers and films having a good property spectrum.

The polyesters according to the invention can, as a rule, be processed at below 370° C. by injection molding, pressing or extrusion.

EXAMPLE 1

The following components were used for the preparation of a novel polyester:
4.2 moles (40.0 mol %) of 4-hydroxybenzoic acid,
0.3 mole (2.85 mol %) of 3-hydroxybenzoic acid,
2.7 moles (25.73 mol %) of terephthalic acid,
0.3 mole (2.85 mol %) of isophthalic acid,
1.8 moles (17.14 mol %) of hydroquinone and 1.2 moles (11.43 mol %) of 4,4'-dihydroxydiphenyl.

These components were initially taken together with 1,360 ml (14.4 moles) of acetic anhydride in a 5 reaction kettle under nitrogen. The stirred mixture was then heated to 150° C. in the course of 30 minutes and then to an external temperature of 345° C. in the course of 150 minutes. Thereafter, the pressure was reduced to 560 mbar and subsequently to half the preceding value, in each case in the course of 10 minutes. The external temperature was increased to 360° C. during this procedure.

The final pressure was 65 mbar.

The intrinsic viscosity of the resulting polyester was 1.9 dl/g, measured in 0.1% strength by weight solution in pentafluorophenol at 60° C.

The polyester gave a filament-forming mesomorphic melt.

DSC (differential scanning calorimetry) measurements gave a melting point of 345° C.

The polymer could readily be processed at 360° C. by injection molding.

The heat distortion point according to ISO/R75, method B, was higher than 250° C.

The shear modulus according to DIN 53,445, at 200° C., was still 36% of the value measured at 20° C. under otherwise identical conditions.

EXAMPLE 2

The following components were used:
4.2 moles (40 mol %) of 4-hydroxybenzoic acid,
0.3 mole (2.85 mol %) of 3-hydroxybenzoic acid,
2.4 moles (22.89 mol %) of terephthalic acid,
0.6 mole (5.70 mol %) of isophthalic acid,
1.5 moles (14.28 mol %) of hydroquinone and
1.5 moles (14.28 mol %) of 4,4'-dihydroxydiphenyl.

The starting compounds were mixed with 1,326 ml (14.07 moles) of acetic anhydride and reacted as described in Example 1.

The final temperature was 360° C. and the final pressure 60 mbar.

The intrinsic viscosity was measured as 2.0 dl/g, determined as described in Example 1.

The melting point (from DSC measurements) was 320° C.

The polymer could readily be processed at 340° C. by injection molding; the heat distortion point according to ISO/R75, method B, was higher than 250° C.

The shear modulus according to DIN 53,445 at 200° C. was still 28% of the value measured at 20° C. under otherwise identical conditions.

EXAMPLE 3

The following starting compounds were used:
3.15 moles (30 mol %) of 4-hydroxybenzoic acid,
0.35 mole (3.35 mol %) of 3-hydroxybenzoic acid,
3.15 moles (30 mol %) of terephthalic acid,
0.35 mole (3.35 mol %) of isophthalic acid,
2.1 moles (20 mol %) of hydroquinone and
1.4 moles (13.3 mol %) of 4,4'-dihydroxydiphenyl.

The starting components were reacted with 1,320 ml (14.07 moles) of acetic anhydride, as described in Example 1. The final temperature was 360° C. and the final pressure 45 mbar.

The intrinsic viscosity of the resulting product, determined as in Example 1, was 1.8 dl/g, the melting point from DSC measurements was 335° C. and the shear modulus according to DIN 53,445 at 200° C. was still 32% of the value determined at 20° C.

The polymer could readily be processed at 360° C. by injection molding.

EXAMPLE 4

The following components were used for the preparation of a novel polyester:
4.2 moles (40.0 mol %) of 4-hydroxybenzoic acid,
0.3 mole (2.85 mol %) of 3-aminobenzoic acid,
2.7 moles (25.73 mol %) of terephthalic acid,
0.3 mole (2.85 mol %) of isophthalic acid,
1.8 moles (17.14 mol % ) of hydroquinone and
1.2 moles (11.43 mol %) of 4,4'-dihydroxydiphenyl.

These components were initially taken together with 1,360 ml (14.4 moles) of acetic anhydride in a 5 l reaction kettle under nitrogen. The stirred mixture was heated to 150° C. in the course of 30 minutes and then to an external temperature of 350° C. in the course of 150 minutes. Thereafter, the pressure was reduced to 680 mbar and subsequently decreased to half the preceding value, in each case in the course of 10 minutes. During the procedure, the external temperature was increased to 360° C.

The final pressure was 85 mbar.

The intrinsic viscosity of the resulting polyester was 2.6 dl/g, measured in 0.1% strength by weight solution in pentafluorophenol at 60° C.

The polyester gave a filament-forming mesomorphic melt.

DSC (differential scanning calorimetry) measurements gave a melting point of 335° C.

The polymer could be readily processed at 350° C. by injection molding.

The heat distortion point according to ISO/R75, method B, was higher than 250° C.

The shear modulus according to DIN 53,445 at 200° C. was still 29% of the value measured at 20° C. under otherwise identical conditions.

EXAMPLE 5

The following components were used:
4.2 moles (40 mol %) of 4-hydroxybenzoic acid
0.3 mole (2.85 mol %) of 4-aminobenzoic acid,
2.4 moles (22.89 mol %) of terephthalic acid,
0.6 mole (5.70 mol %) of isophthalic acid,
1.8 moles (17.14 mol %) of hydroquinone and
1.5 moles (11.44 mol %) of 4,4'-dihydroxydiphenyl.

The starting compounds were mixed with 1,330 ml (14.1 moles) of acetic anhydride and reacted as described in Example 1.

The final temperature was 360° C. and the final pressure 43 mbar.

The intrinsic viscosity was measured as 2.6 dl/g, determined as in Example 1.

The melting point (from DSC measurements) was 340° C.

The polymer could readily be processed at 360° C. by injection molding; the heat distortion point according to ISO/R75, method B, was higher than 250° C.

The shear modulus according to DIN 53,445 at 200° C. was still 34% of the value measured at 20° C. under otherwise identical conditions.

EXAMPLE 6

The following starting compounds were used:
4.05 moles (38.57 mol %) of 4-hydroxybenzoic acid,
0.45 mole (4.29 mol %) of 4-aminobenzoic acid,
2.4 moles (22.86 mol %) of terephthalic acid,
0.6 mole (5.71 mol %) of isophthalic acid,
1.8 moles (17.14 mol %) of hydroquinone and
1.2 moles (11.43 mol %) of 4,4'-dihydroxydiphenyl.

The starting components, together with 1,330 ml (14.1 moles) of acetic anhydride, were reacted as described in Example 1. The final temperature was 360° C. and the final pressure 55 mbar.

The intrinsic viscosity of the resulting product, determined as in Example 1, was 2.4 dl/g, the melting point from DSC measurements was 345° C. and the shear modulus according to DIN 53,445 at 200° C. was still 36% of the value determined at 20° C.

The polymer could readily be processed at 360° C. by injection molding.

COMPARATIVE EXAMPLE 1

(Example 3 from German Laid-Open Application DOS No. 3,517,587)

The following components were used:
0.306 mole (50 mol %) of 4-hydroxybenzoic acid,
0.134 mole (21.85 mol %) of terephthalic acid,
0.019 mole (3.03 mol %) of isophthalic acid and
0.154 mole (25.12 mol %) of 4,4'-dihydroxydiphenyl.

The components are reacted with 67.4 ml of acetic anhydride, as described in Example 1.

The final external temperature was 360° C. and the final pressure 8 mbar.

In contrast to Examples 1 to 6, in which the reaction gave a filament-forming mesomorphic melt, the reaction product in this case was solid and had a grayish yellow color.

The polymer could not be melted below 400° C. and was insoluble in pentafluorophenol, so that it was also impossible to determine its relative viscosity.

A product prepared by the process in DE-A- No. 35 17 587 (Example 3) and having the same composition was likewise infusible below 400° C. and hence could not be processed by a thermoplastic method below this temperature.

COMPARATIVE EXAMPLE 2

(Example 4 from DE-A No. 35 17 587)

The following components were used: 0.37 mole (64.92 mol %) of 4-hydroxybenzoic acid, 0.1 mole (17.54 mol %) of isophthalic acid and 0.1 mole (17.54 mol %) of 4,4'-dihydroxydiphenyl.

The components were reacted with 62 ml of acetic anhydride, as described in Example 1.

The final temperature in this case was 330° C. and the final pressure 53 mbar.

The intrinsic viscosity of the resulting product was 1.9 dl/g, and the polymer showed a good tendency to form filaments from the anisotropic melt.

The shear modulus according to DIN 53,445 at 200° C. was however only 0.6% of the value measured at 20° C. under otherwise identical conditions.

The Examples above show that the novel wholly aromatic polyesters have a generally substantially improved property spectrum, particularly in comparison with the products disclosed in DE-A No. 35 17 587.

We claim:

1. A wholly aromatic thermotropic polyester based on
(A) from 25 to 60 mol % of a mixture of
   ($A_1$) 4-hydroxybenzoic acid and
   ($A_2$) 3-hydroxybenzoic acid, 4-aminobenzoic acid and/or 3-aminobenzoic acid or their chlorine, bromine, $C_1$–$C_8$-alkyl or $C_1$–$C_8$-alkoxy derivatives, substituted in the nucleus,
   the molar ratio $A_1$ to $A_2$ being from 5:1 to 41:1,
(B) from 20 to 37.5 mol % of a mixture of
   ($B_1$) terephthalic acid and
   ($B_2$) isophthalic acid,
   the molar ratio of $B_1$ to $B_2$ being from 1.04:1 to 19:1, and
(C) from 20 to 37.5 mol % of a mixture of
   ($C_1$) hydroquinone and
   ($C_2$) 4,4'-dihydroxydiphenyl,
   the molar ratio of $C_1$ to $C_2$ being from 0.1:1 to 2.67:1 and the molar ratio of B to C being from 0.9:1 to 1.1:1.

2. A wholly aromatic thermotropic polyester as claimed in claim 1, wherein the molar ratio of $A_1$ to $A_2$ is from 6:1 to 20:1.

3. A wholly aromatic thermotropic polyester as claimed in claim 1, wherein the molar ratio of components $B_1$ to $B_2$ is from 1.5:1 to 10:1.

4. A wholly aromatic thermotropic polyester as claimed in claim 1, wherein the molar ratio of components $C_1$ to $C_2$ is from 0.5:1 to 2.33:1.

5. A wholly aromatic thermotropic polyester as claimed in claim 1, obtainable by single-stage polycondensation of the components $A_1$, $A_2$, $B_1$, $B_2$, $C_1$ and $C_2$ in the melt in the presence of a 5-60% molar excess, based on the total content of OH groups, of an anhydride of an alkanecarboxylic acid of 2 to 6 carbon atoms.

6. A process for the preparation of a wholly aromatic thermotropic polyester as claimed in claim 1 or 2 or 3 or 4 or 5, by single-stage polycondensation in the melt in the presence of an anhydride of an alkanecarboxylic acid of 2 to 6 carbon atoms, wherein the components $A_1$, $A_2$, $B_1$, $B_2$, $C_1$ and $C_2$ are reacted in the presence of a 5-60% molar excess, based on the total content of OH groups, of the anhydride of the alkanecarboxylic acid.

7. A process as claimed in claim 6, wherein, after the reaction in the melt, the resulting product is subjected to postcondensation in the solid phase.

8. A dimensionally stable molding containing, as an essential component, a wholly aromatic thermotropic polyester as claimed in claim 1 or obtained as claimed in claim 6.

* * * * *

UNITED STATES PATENT AND TRADEMARK OFFICE
CERTIFICATE OF CORRECTION

PATENT NO. : 4,764,582
DATED : Aug. 16, 1988
INVENTOR(S) : Bernd HISGEN, et al.

It is certified that error appears in the above-identified patent and that said Letters Patent is hereby corrected as shown below:

ON THE TITLE PAGE:

[73] Assignee: "Akjtiengesellschaft" should be
--Aktiengesellschaft--,

"Rheinland-Pflaz" should be
--Rheinland-Pfalz--.

Signed and Sealed this

Twenty-eighth Day of March, 1989

Attest:

DONALD J. QUIGG

Attesting Officer

Commissioner of Patents and Trademarks